United States Patent
Dalke et al.

(10) Patent No.: US 11,048,324 B2
(45) Date of Patent: Jun. 29, 2021

(54) METHOD FOR CONTROLLING A LOW CONSUMPTION MODE OF AN ELECTRONIC CIRCUIT UNIT, CONTROL DEVICE, AND MOTOR VEHICLE

(71) Applicant: Audi AG, Ingolstadt (DE)

(72) Inventors: Christoph Dalke, Kipfenberg (DE); Daniel Depner, Neutraubling (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/645,868

(22) PCT Filed: Sep. 8, 2018

(86) PCT No.: PCT/EP2018/075114
§ 371 (c)(1),
(2) Date: Mar. 10, 2020

(87) PCT Pub. No.: WO2019/063340
PCT Pub. Date: Apr. 4, 2019

(65) Prior Publication Data
US 2020/0264693 A1    Aug. 20, 2020

(30) Foreign Application Priority Data
Sep. 27, 2017    (DE) ..................... 10 2017 217 239.8

(51) Int. Cl.
*G06F 1/3296* (2019.01)
*B60R 16/03* (2006.01)
(Continued)

(52) U.S. Cl.
CPC ............ *G06F 1/3296* (2013.01); *B60R 16/03* (2013.01); *G06F 1/28* (2013.01); *G06F 1/32* (2013.01); *H02H 3/08* (2013.01); *H02J 1/14* (2013.01)

(58) Field of Classification Search
CPC ... B60R 16/03; G06F 1/32; G06F 1/28; G06F 1/3296; H02H 3/08; H02J 1/14;
(Continued)

(56) References Cited

U.S. PATENT DOCUMENTS 6,473,608 B1    10/2002 Lehr et al.
9,690,353 B2    6/2017 Moran et al.
(Continued)

FOREIGN PATENT DOCUMENTS

DE    19830581 A1    1/2000
DE    10312553 B3    7/2004
(Continued)

OTHER PUBLICATIONS

International Search Report and Written Opinion of the International Searching Authority directed to related International Patent Application No. PCT/EP2018/075114, dated Dec. 12, 2018, with attached English-language translation; 19 pages.
(Continued)

*Primary Examiner* — Arnold M Kinkead
(74) *Attorney, Agent, or Firm* — Sterne, Kessler, Goldstein & Fox P.L.L.C.

(57) ABSTRACT

The present disclosure relates to a method for controlling a low-consumption mode of an electronic switching unit, which is supplied with an electrical operating current via a current path, wherein a circuit-external power control unit transmits an activation command for activating the low-consumption mode to the switching unit. A measuring device for generating a consumption signal that is a function of an amperage of the operating current being operated in the current path is disclosed. After the activation command has been transmitted the power control unit uses the consumption signal to determine whether the amperage is still above a threshold value that is specified for the low-consumption
(Continued)

mode, and in this case a predetermined emergency measure is initiated to force the low-consumption mode and/or to reduce the amperage.

10 Claims, 1 Drawing Sheet

(51) Int. Cl.
*G06F 1/28* (2006.01)
*H02J 1/14* (2006.01)
*G06F 1/32* (2019.01)
*H02H 3/08* (2006.01)

(58) Field of Classification Search
CPC . H02J 7/0068; B60L 11/1803; B60L 2210/40; B60L 2210/10; B60L 11/1861
USPC ............... 307/10.1, 9.1; 318/139; 191/3; 323/271, 273, 276; 701/108
See application file for complete search history.

(56) References Cited

U.S. PATENT DOCUMENTS

| | | |
|---|---|---|
| 10,048,737 B2 | 8/2018 | Dalke |
| 2007/0188150 A1* | 8/2007 | Yamaguchi ........... H02J 7/0029 320/136 |
| 2010/0064124 A1 | 3/2010 | Rinne et al. |
| 2016/0181866 A1* | 6/2016 | Moeskops ........... G06F 13/4282 710/313 |
| 2016/0226236 A1* | 8/2016 | Djelassi ................ H02H 7/261 |
| 2016/0248262 A1 | 8/2016 | Maruyama |
| 2018/0189045 A1 | 7/2018 | Dalke et al. |
| 2018/0191269 A1* | 7/2018 | Knight ................. H02M 7/493 |

FOREIGN PATENT DOCUMENTS

| | | |
|---|---|---|
| DE | 102004052905 A1 | 5/2006 |
| DE | 102007055231 A1 | 6/2009 |
| DE | 102014003704 A1 | 9/2014 |
| DE | 102014008479 A1 | 12/2015 |
| DE | 102014019435 A1 | 6/2016 |
| EP | 1145494 A2 | 10/2001 |

OTHER PUBLICATIONS

International Preliminary Report on Patentability directed to related International Patent Application No. PCT/EP2018/075114, completed Nov. 4, 2019, with attached English-language translation; 13 pages.

\* cited by examiner

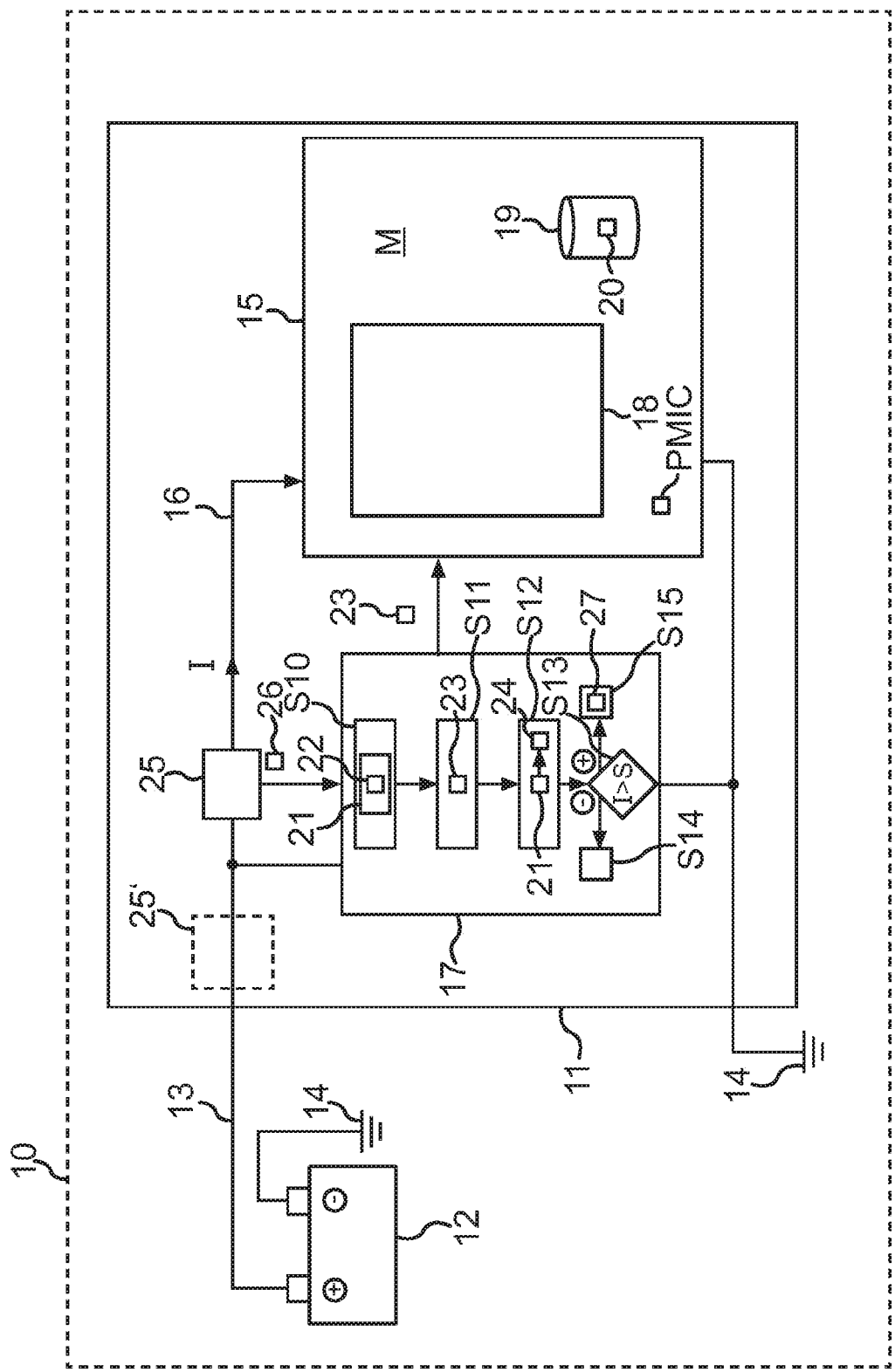

METHOD FOR CONTROLLING A LOW CONSUMPTION MODE OF AN ELECTRONIC CIRCUIT UNIT, CONTROL DEVICE, AND MOTOR VEHICLE

TECHNICAL FIELD

The present disclosure relates to a method for controlling a low-consumption mode (for example a low-power mode) of an electronic switching unit. The low-consumption mode is intended to reduce an amperage of an electrical operating current of the switching unit. The low-consumption mode is triggered by a circuit-external power control unit (power controller). The present disclosure also includes a control unit comprising the switching unit and the power control unit, as well as a motor vehicle.

BACKGROUND

A control device comprising an electronic switching unit and a power control unit is known, for example, from DE 10 2014 008 479 A1. A control device for a motor vehicle is described therein, which has a so-called system-on-chip (SOC) as the electronic switching unit. Energy management can be carried out by a separate power control unit, which decides which switching unit of the control unit is currently to be supplied with an operating current or not. As a result, however, a switching unit may only be switched on or off. If a switching unit is operated continuously and its power consumption is to be reduced by means of a low-consumption mode, the power control unit cannot check whether the switching unit is actually reducing its power consumption or, alternatively, whether the power consumption remains high, for example due to a fault in control software of the switching unit.

Energy management for a switching unit is also known from DE 10 2014 003 704 A1. The energy management is carried out by a power control unit (power controller). The power control unit can transmit an activation command to activate a low-consumption mode to the switching unit. The switching unit can then activate the low-consumption mode and thereby reduce the amperage of its operating current. If, due to a fault, for example, in an operating system of the switching unit, the low-consumption mode is not activated after receipt of the activation command, the current consumption of the switching unit remains high without this being recognized by the power control unit.

From U.S. Pat. Pub. No. 2010/0064124 A1 it is known that a power control unit (power controller) can interrupt a current path of a switching unit by connecting a DC-DC converter in the current path. An amperage of the electrical operating current currently drawn by the switching unit can also be detected by means of the DC-DC converter. By means of this power control unit, however, a switching unit can only be controlled externally, namely indirectly by adjusting the amperage by means of the DC-DC converter. Direct coordination with the switching unit supplied via the DC-DC converter is not provided.

A low-consumption mode can thus be provided in an electronic switching unit in order to reduce the electrical power consumption of the switching unit, for example after a predetermined period of time during which the switching unit is not in use. For this purpose, an activation command for activating the low-consumption mode can be transmitted to the electronic switching unit by a power controller, that is, a circuit-external power control unit. This must then react by activating the low-consumption mode. A low-consumption mode can be software-controlled, as is the case, for example, in the suspend-to-RAM mode, in which operation of the electronic switching unit is interrupted and its current operating state is preserved in a RAM (RAM—Random Access Memory). Thereafter, for example, driver software of the electronic switching unit ensures that the switching unit is de-energized except for its RAM. For this purpose, a PMIC (Power Management Integrated Circuit) of the switching unit can be driven by the driver software. However, if such driver software has an error, components of the switching unit might not be switched off. Then, although the operation of the switching unit is interrupted, its power consumption remains high.

This is particularly problematic when the electronic switching unit is supplied with electrical power from an energy store, for example a battery. This may in particular be true in the case of a motor vehicle if such an electronic switching unit is to be operated in a low-consumption mode in a control unit because the motor vehicle is, for example, switched off or interrupted and the control unit can therefore be supplied with electrical power exclusively via the motor vehicle's battery. An example of such a control unit with an electronic switching unit that can be operated in the low-consumption mode is an infotainment system (information entertainment system). If the initiation of the low-consumption mode fails, the battery is discharged unnecessarily.

From DE 103 12 553 B3 it is known that a plurality of control devices can be monitored together after they have been switched off to determine whether at least one of the control devices still has a current consumption which is above a threshold value. Depending on the total amperage measured, a conclusion is drawn about the control unit with the faulty idle state through which the control unit continues to consume its normal operating current. For this purpose, a table stores the operating current it consumes for each control unit.

From DE 198 30 581 A1 it is known to wire a motor vehicle function, for example a windshield wiper, redundantly. Microprocessors of the circuit can have different sleep modes, for example a sleep mode and a shipping mode.

It is known from DE 10 2014 019 435 A1 that an infotainment system can have a suspend-to-RAM state and a deep sleep state as possible sleep modes. Depending on the sleep mode, there are different amperages for the bias current.

The object of the present disclosure is to reliably activate a low-consumption mode in an electronic switching unit.

The object is achieved by the subject matters of the independent claims. Advantageous refinements of the present disclosure are described by the dependent claims, the following description, and the drawings.

BRIEF DESCRIPTION OF DRAWINGS/FIGURES

FIG. 1 illustrates a schematic representation of a motor vehicle, in accordance with some embodiments.

DETAILED DESCRIPTION

The present disclosure provides a method for controlling or setting a low-consumption mode of an electronic switching unit. The electronic switching unit can be, for example, a system-on-chip, SOC, in a control unit. The method assumes that this switching unit is supplied with an electrical operating current via a current path. In the method, an activation command for activating the low-consumption mode is transmitted to the switching unit by a circuit-external power control unit or a circuit-external power controller. "Circuit-external" means that the power control unit and the electronic switching unit represent two different units, i.e., the power control unit and the electronic switching unit are different. If the electronic switching unit now receives the activation command, it should, according to the intended purpose, activate the low-consumption mode, that is, the amperage of its electrical operating current should be reduced or decreased. However, if there is a fault in the electronic switching unit, it may not respond correctly or completely to the activation command and the operating current thus may not be reduced in the planned or intended manner.

In some embodiments, it is provided that a measuring device is operated in the current path, via which the electronic switching unit receives its operating current and is configured to generate a consumption signal which is a function of an amperage of the operating current. Such a measuring device can be designed in a manner known to a person skilled in the art. For example, a so-called shunt resistor can be provided, via which the operating current or a portion of the operating current is conducted.

In some embodiments, after the activation command has been transmitted, the power control unit uses the consumption signal to determine whether the amperage of the operating current is still above a threshold value specified for the low-consumption mode. The power control unit, therefore, uses the consumption signal to check whether the amperage of the operating current actually drops or is below the threshold value, which would have been undershot if the low-consumption mode was successfully activated. If the amperage is still above the threshold value, the power control unit in this case initiates a predetermined emergency measure to force the low-consumption mode and/or to reduce the amperage. The reduction in the amperage can therefore either provide forcing the low-consumption mode or else an alternative switching measure that differs from the low-consumption mode.

In some embodiments, regardless of a fault in the electronic switching unit, after the activation command has been transmitted, it can be ensured that the electronic switching unit reduces its consumption of electrical power, that is, the amperage of the operating current is reduced.

In some embodiments, the low-consumption mode is selected as a function of a current operating strategy from a plurality of specified low-consumption modes. By way of non-limiting example, it can be provided that a plurality of different stages of reducing the amperage of the operating current are made possible. Which low-consumption mode, that is, which stage of the reduction, should currently be triggered or set by means of the activation command can be determined by a current operating strategy for the switching unit. Such an operating strategy can, for example, provide for a gradual reduction in the operating current over time, during which the switching unit is not required. Accordingly, a response time to a new operation is also extended only in stages. If the switching unit is not needed or not operated only for a short time, the response time for a new operation is correspondingly short. A first specified low-consumption mode can be an energy-saving mode. A second specified low-consumption mode can be a suspend-to-RAM mode. The selection of the low-consumption mode can be made by an energy management function of the power control unit, which can be implemented, for example, as a program module of the power control unit. The present disclosure now provides that a mode-specific threshold value for the amperage is provided for each of the specified low-consumption modes. Accordingly, the measurement sensitivity or sensitivity of the power control unit is adapted to the low-consumption mode. A threshold value in the range from 8 mA to 20 mA can be provided for the suspend-to-RAM mode. A threshold value in the range from 120 mA to 200 mA can be provided for the energy-saving mode.

In some embodiments, the emergency measure includes switching off the switching unit. This ensures, regardless of a current operating state of the electronic switching unit, in particular regardless of a current fault state, that the operating current is reduced or dropped below the threshold value. By way of non-limiting example, the emergency measure can include triggering a reset of the switching unit. This has the advantage that the electronic switching unit can then be switched again into the low-consumption mode by means of an activation command and the switching unit thus reaches a defined operating state. The emergency measure can also initially trigger the reset and, in the event of another failure (amperage remains above the threshold), provide for the shutdown.

In some embodiments, an energy-saving mode (low-power mode) of the switching unit is activated as the low-consumption mode by means of the activation command. In the energy-saving mode, the switching unit continues to operate with a processor cycle of a processor device of the switching unit that is reduced compared to a normal operating mode. Accordingly, at least one function of the switching unit remains available. It is implemented only slowly. By way of non-limiting example, a suspend-to-RAM mode can be activated as the low-consumption mode, in which an operation of the switching unit is interrupted and an operating state of the switching unit is nevertheless preserved in a RAM. Accordingly, only the RAM has to be supplied with the operating current, while a processor device of the switching unit, for example, a CPU (central processing unit) can be switched off. As a result, the amperage of the operating current is reduced more than in an energy-saving mode.

In some embodiments, the checking of the amperage of the operating current is started as a function of a state-reached signal of the energy management function of the power control unit, the state-reached signal signaling that the switching unit should have reached the low-consumption mode as expected. This prevents a false alarm due to an early measurement of the amperage. Depending on, for example, a type of switching unit, the energy management function can provide a predetermined waiting time that must elapse between the transmission of the activation command and the generation of the state-reached signal before the amperage of the operating current is checked.

In some embodiments, the consumption signal is used to check the amperage repeatedly or cyclically. This can compensate for a variability or tolerance that may arise in the switching unit when the low-consumption mode is reached. For example, a different amount of time for setting the low-consumption mode in the switching unit may pass if a different number of applications are active in the switching unit while the activation command arrives.

In some embodiments, the measuring device detects the amperage with a measuring accuracy that is within a range greater than 1 mA, in particular greater than 3 mA. By way of non-limiting example, the measurement accuracy does not have to be very high. It is sufficient to determine whether the threshold has been fallen below or not. In this way, an inexpensive measuring device can be provided or used. The exact consumption value of the operating current is not important. The threshold value can then be provided with a corresponding tolerance.

In some embodiments, the power control unit deactivates itself in the event that the amperage is below the threshold value, that is, it switches off or at least reduces a system cycle. Accordingly, the need for electrical power is further reduced.

In some embodiments, as described above, the electronic switching unit and the power control unit are in particular part of a control unit. Accordingly, a control device with the electronic switching unit and with a different power control unit (power controller) is disclosed. The switching unit can be, for example, an electronic circuit or an integrated circuit (IC) or a system-on-chip (SOC). A current path is provided in the control device in order to supply the switching unit with an electrical operating current. The supply path can be formed, for example, on the basis of at least one conductor track of a circuit board and/or at least one cable. The supply path can also run entirely or partially within a system-on-chip (SOC). In the control device according to various embodiments as described herein, a measuring device for generating a consumption signal that is a function of an amperage of the operating current is provided in the current path. In the manner described, the measuring device can be designed as known to a person skilled in the art. For example, said shunt resistor can be connected in the current path. The control device is designed to implement an embodiment of the method as described herein. For this purpose, the power unit can have, for example, a processor device, such as, for example, at least one microcontroller or at least one microprocessor. A program code can be provided, which is configured to carry out the steps of the method according to various embodiments as described herein and relating to the power unit when executed by the processor device. The program code may be stored in a data memory of the processor device.

In some embodiments, the switching unit is supplied with an operating current from an energy store, such as a battery. In this context, a motor vehicle having at least one control device which is an embodiment of the control device is disclosed. In this way, in the battery-operated state of the motor vehicle, for example, when the ignition is switched off, it can be ensured that the control device can reliably reduce its electrical power requirement. The motor vehicle is preferably designed as a car, in particular as a passenger car or truck.

An exemplary embodiment of the present disclosure is described below. For this purpose, FIG. 1 shows a schematic representation of an embodiment of the motor vehicle as described herein.

In the embodiments described in this disclosure, the components of the embodiments that are described each constitute individual features to be considered independently of each other and in a combination that is different from the combination described. In addition, the embodiments described may also be supplemented by further features, which have already been described.

In accordance with some embodiments, the FIG. 1 shows schematically a motor vehicle 10, which may be, for example, a motor vehicle, in particular a passenger car or truck. The motor vehicle 10 can have a control unit 11, which may be, for example, a control unit for an infotainment system. The control device 11 may be supplied with electrical power via an energy store 12, for example a battery. This may be the case, for example, when the motor vehicle 10 is driven purely electrically or when an internal combustion engine of the motor vehicle 10 is switched off. For the power supply, the control unit 11 can be connected to the energy store 12 via an electrical vehicle electrical system 13, which is indicated here only symbolically. A circuit can be closed via a ground potential 14 of the motor vehicle 10.

The control device 11 can have an electronic switching unit 15, which can be, for example, an SOC (system-on-chip). In the control unit 11, the switching unit 15 can receive an operating current I for operation via a current path 16, which can be formed, for example, on the basis of at least one conductor track of a circuit board and/or a cable. The supply path can also run entirely or partially within a system-on-chip (SOC).

The control unit 11 can furthermore have a power control unit 17. The power control unit 17 represents a power controller.

To reduce power consumption, the switching unit 15 can have a low-energy mode M, in which, for example, a processor device 18 of the switching unit 15 is operated with a system cycle that is reduced compared to a normal operating mode, or in which state data 20 that describe an operating state of the switching unit 15 are stored in a RAM 19, and then the processor device 18 is switched off. The processor device 18 may comprise, for example, a CPU of the switching unit 15.

When the low-consumption mode M of the switching unit 15 is activated, the power control unit 17 can be used to decide and/or control. For this purpose, in a step S10 an energy management function 21 of the power control unit 17 can check an activation criterion 22, which can say, for example, that the low-consumption mode M is to be activated if the control unit 11 is unoperated or unused for a predetermined minimum period of time. In a step S11, the power control unit 17 can send an activation command 23 to the switching unit 15 if the activation criterion 22 is met. The activation command 23 can be transmitted, for example, via a UART port (Universal Asynchronous Receiver Transmitter), via an SPI (Serial Peripheral Interface), via a GPIO port (GPIO—General Purpose Input Output), and/or via an I2C-Bus (I2C—IC to IC; IC—Integrated Circuit).

The energy management function 21 can be used in a step S12 to signal by a state-reached signal 24 when the switching unit 15 should have reached the low-consumption mode M as expected.

The power control unit 17 can then check whether the switching unit 15 has actually reached the low-consumption mode M. For this purpose, a measuring device 25 configured to generate a consumption signal 26 which is a function of the amperage of the operating current I can be connected in the current path 16. Whether the amperage of the operating current I is greater than a threshold value S (I>S) which can be provided for the low-consumption mode M can be checked in a step S13. If the amperage is less than the threshold value S (symbolized in the FIGURE by a "−" sign), a power saving mode for the power control unit 17 itself can also be activated or the power control unit 17 can be switched off in a step S14. If, on the other hand, the amperage of the operating current I is greater than the threshold value S (symbolized in the FIGURE by a "+" sign), a predetermined emergency measure 27 can be activated in a step S15. The emergency measure 27 can provide that the switching unit 15 is switched off, that is, the operating current I is interrupted, or that the switching unit 15 is restarted.

If it is recognized by an external signal or (with the power control unit 17 still operating) by the energy management function 21 that the switching unit 15 is to switch back to the normal operating mode, a measure known per se from the prior art for activating the normal operating mode of the switching unit can be carried out.

A current monitor is thus provided for the power control unit 17, which monitors the current consumption of the switching unit 15 with the RAM 19 or alternatively also for the entire control unit 10 (symbolized in the FIGURE by the item 25'). The accuracy of the measurement is of secondary importance and only has to be within a measuring range from 1 mA to 10 mA measuring range and can be carried out inexpensively.

When the switching unit 15 is in the low-consumption mode M (for example, a suspend-to-RAM mode), the power control unit 17 can put itself into the sleep state or energy-saving state. Before that, however, the current consumption is measured cyclically by means of the consumption signal 26 of the measuring device 25. In addition, information from the energy management function 21 can be used, for example the state-reached signal 24. The threshold value S can then be used to check whether the amperage of the operating current I of the switching unit 15 exceeds the limit value, even though the energy management function 21 signals that the low-consumption mode M should have been reached. In this case, the emergency measure 27 can be taken. This would lead to switching off or resetting the switching unit 15, for example, by driving the entire control unit 16 accordingly.

A current control unit can use the current monitoring to check whether the low-consumption mode M (for example suspend-to-RAM) has been safely reached. Since the test, that is, the method steps S10 to S15, can take place in software as program code, the power control unit 17 can be adapted to different switching units and/or hardware variants of a switching unit with little effort by defining a corresponding threshold value S for the amperage of the operating current I. The logic remains the same and is independent of the monitored switching unit 15.

To set the low-consumption mode M, the switching unit 15 can have a PMIC (Power Management Integrated Circuit).

The low-consumption mode M can be an energy-saving mode or a suspend-to-RAM mode. For example, 150 mA can be provided as the threshold value for the energy-saving mode. 10 mA can be provided, for example, as the threshold value for the suspend-to-RAM mode.

The energy management function 21 can select the low-consumption mode M to be set or activated from a plurality of specified low-consumption modes.

Overall, the examples show how the present disclosure can provide a suspend-to-RAM monitoring.

The invention claimed is:

1. A method for controlling an electronic switching unit of a motor vehicle, the method comprising:
supplying an electrical operating current via a current path to the electronic switching unit;
generating a consumption signal by a measuring device located in the current path as a function of an amperage of the electrical operating current;
based on the consumption signal, selecting a low-consumption mode from a plurality of predefined low-consumption modes as a function of current operating strategy and a stage of a plurality of stages associated with the low-consumption mode, wherein the plurality of stages correspond with reducing the amperage of the electrical operating current in different amounts;
transmitting, from a circuit-external power control unit to the electronic switching unit, an activation command for activating the low-consumption mode in the selected stage;
upon transmitting the activation command, based on a signal indicating a state of an energy management function of the circuit-external power control unit corresponding to the selected low-consumption mode, comparing the amperage of the electrical operating current with a preconfigured amperage threshold value for the selected low-consumption mode;
based on the comparison indicating the amperage of the electrical operating current being above the preconfigured amperage threshold value for the selected low-consumption mode, initiating a predetermined emergency measure to reduce the amperage of the electrical operating current applying another stage of the plurality of different stages; and
based on the comparison indicating the amperage of the electrical operating current being below the preconfigured amperage threshold value for the selected low-consumption mode, deactivating the circuit-external power control unit.

2. The method of claim 1, further comprising initiating the predetermined emergency measure by switching off and/or triggering a restart of the electronic switching unit.

3. The method of claim 1, further comprising operating the electronic switching unit with a reduced processor clock in the selected low-consumption mode.

4. The method of claim 1, further comprising operating the electronic switching unit in a suspended RAM mode.

5. The method of claim 1, further comprising:
interrupting an operation of the electronic switching unit; and
storing an operating state of the electronic switching unit in a RAM memory.

6. The method of claim 1, further comprising generating the consumption signal repeatedly or cyclically to check the amperage of the electrical operating current.

7. The method of claim 1, further comprising generating the consumption signal with an accuracy greater than 1 milliampere (mA).

8. A control device of a motor vehicle, comprising:
an electronic switching unit;
a power control unit;
a current path for supplying the electronic switching unit with an electrical operating current; and
a measuring device located in the current path, wherein the measuring device is configured to generate a consumption signal as a function of an amperage of the electrical operating current,
wherein the power control unit is configured to:
based on the consumption signal, select a low-consumption mode from a plurality of predefined low-consumption modes as a function of current operating strategy and a stage of a plurality of stages associated with the low-consumption mode, wherein the plurality of stages correspond with reducing the amperage of the electrical operating current in different amounts,
transmit, from a power control unit to the electronic switching unit, an activation command for activating the low-consumption mode in the selected stage,
upon transmitting the activation command, based on a signal indicating a state of an energy management function of the power control unit corresponding to the selected low-consumption mode, compare the amperage of the electrical operating current with a preconfigured amperage threshold value for the selected low-consumption mode, based on the comparison indicating the amperage of the electrical operating current being above the preconfigured amperage threshold value for the selected low-consumption mode, initiate a predetermined emergency measure to reduce the amperage of the electrical operating current applying another stage of the plurality of different stages, and based on the comparison indicating the amperage of the electrical operating current being below the preconfigured amperage threshold value for the selected low-consumption mode, deactivate the power control unit.

9. The control device of claim 8, wherein the power control unit is further configured to:

initiate the predetermined emergency measure by switching off and/or triggering a restart of the electronic switching unit.

10. A motor vehicle, comprising:

at least one control device that comprises:
   an electronic switching unit;
   a power control unit;
   a current path for supplying the electronic switching unit with an electrical operating current; and
   a measuring device located in the current path, wherein the measuring device is configured to generate a consumption signal as a function of an amperage of the electrical operating current,
   wherein the power control unit is configured to:
      based on the consumption signal, select a low-consumption mode from a plurality of predefined low-consumption modes as a function of current operating strategy and a stage of a plurality of stages associated with the low-consumption mode, wherein the plurality of stages correspond with reducing the amperage of the electrical operating current in different amounts, transmit, from a power control unit to the electronic switching unit, an activation command for activating the low-consumption mode in the selected stage, upon transmitting the activation command, based on a signal indicating a state of an energy management function of the power control unit corresponding to the selected low-consumption mode, compare the amperage of the electrical operating current with a preconfigured amperage threshold value for the selected low-consumption mode, based on the comparison indicating the amperage of the electrical operating current being above the preconfigured amperage threshold value for the selected low-consumption mode, initiate a predetermined emergency measure to reduce the amperage of the electrical operating current applying another stage of the plurality of different stages, and based on the comparison indicating the amperage of the electrical operating current being below the preconfigured amperage threshold value for the selected low-consumption mode, deactivate the power control unit.

\* \* \* \* \*